United States Patent
Johns et al.

(10) Patent No.: US 6,537,947 B1
(45) Date of Patent: Mar. 25, 2003

(54) ACTIVATED CARBONS FROM LOW-DENSITY AGRICULTURAL WASTE

(75) Inventors: Mitchell M. Johns, Metairie, LA (US); Christopher A. Toles, River Ridge, LA (US); Wayne E. Marshall, Slidell, LA (US)

(73) Assignees: The United States of America as represented by the Secretary of Agriculture, Washington, DC (US); Board of Supervisors of Louisiana State Univ. of Agricultural & Mechanical College, Baton Rouge, LA (US)

( * ) Notice: Subject to any disclaimer, the term of this patent is extended or adjusted under 35 U.S.C. 154(b) by 406 days.

(21) Appl. No.: 08/834,051

(22) Filed: Apr. 11, 1997

(51) Int. Cl.⁷ .............................. C01B 31/10
(52) U.S. Cl. ....................... 502/416; 502/433
(58) Field of Search .................. 502/433, 437, 502/429, 416; 423/445 R

(56) References Cited

U.S. PATENT DOCUMENTS

| | | | |
|---|---|---|---|
| 1,502,592 A | * 7/1924 | Sauer | 502/432 |
| 1,968,846 A | * 8/1934 | Morrell | 502/425 |
| 3,951,907 A | * 4/1976 | Mehta | 106/407 |
| 3,960,761 A | * 6/1976 | Burger et al. | 502/429 |
| 4,616,001 A | * 10/1986 | Sato | 502/432 |
| 5,858,911 A | * 1/1999 | Wellen et al. | 423/445 R |
| 5,972,536 A | * 10/1999 | Yamada et al. | 423/445 R |

OTHER PUBLICATIONS

Gonzalez–Ulchez, "the Controlled Reaction of Active Carbons with Air at 350° C–I" in Carbon vol. 17 pp. 441–446 1979 (no month).*

* cited by examiner

*Primary Examiner*—Stuart L. Hendrickson
(74) *Attorney, Agent, or Firm*—John D. Fado; Joseph A. Lipovsky

(57) ABSTRACT

Activated carbons derived from low-density lignocellulosic agricultural waste, and for use in absorption of metals, are prepared utilizing carbon dioxide or steam activation at 800° C. to 950° C. for 3 to 12 hours and subsequent oxidation with air at 260° C. to 400° C. for 3 to 6 hours. Granular carbons are formed by the inclusion of a preliminary two-step process involving the admixture of a binder selected from molasses, coal tar or wood tar to form pellets, briquettes or extrudates and converting them into a char under an inert atmosphere at 700° C. to 750° C. for 1 to 2 hours.

10 Claims, No Drawings

ACTIVATED CARBONS FROM LOW-DENSITY AGRICULTURAL WASTE

BACKGROUND OF THE INVENTION

1. Field of the Invention

Activated carbons are high porosity, high surface area materials used in industry for purification and chemical recovery operations as well as environmental remediation. Toxic metal contamination of various water sources is a significant problem in many parts of the United States. Activated carbons, which can be produced from a number of precursor materials including coal, wood and agricultural wastes, are now being actively utilized for remediation of this problem. Carbon production is an expanding industry in the United States, with a present production rate of over 300 million pounds a year and a growth rate of over 5% annually. The present invention relates to the development of specifically modified carbons from low-density agricultural waste products that possess enhanced adsorption properties with regard to the uptake of metal ions.

2. Description of the Prior Art

The production of carbon, in the form of charcoal, is an age-old art. Carbon, when produced by non-oxidative pyrolysis, is a relatively inactive material possessing a surface area limited to several square meters per gram. In order to enhance its activity, a number of protocols have been developed. These include chemical treatment of the carbonaceous material with various salts or acids prior to pyrolysis, or a reaction of the already pyrolyzed product with high temperature carbon dioxide or steam. Activated carbon is able to preferentially adsorb organic compounds and non-polar materials from either liquid or gaseous media. This property has been attributed to its possession of a form which conveys the desirable physical properties of high porosity and large surface area.

Usmani et al., in their paper entitled "Preparation and Liquid-Phase Characterization of Granular Activated-Carbon from Rice Husk", [*Bioresource Technology*, 48, (1994), pp.31–35] teach a process for the preparation of granular activated carbons from both high- and low-ash rice husks by the use of zinc chloride in the dual functions of an activating agent and a binder.

Morgan et al., in a publication entitled "Binders and Base Materials for Active Carbon", [*Industrial and Engineering Chemistry*, Vol. 38, No. 2, (1946), pp.219–227] disclose that various glucose carbohydrates differ markedly as materials for activated carbons; with dextrose behaving as a binder, cellulose as a base material, and starch having properties intermediate to either.

Arida et al., in "Production of High Quality Adsorbent Charcoal from Phil. Woods II. Granulated Activated Carbon", [*Philippine Journal of Science*, Vol. 121, No.1, pp.31–52], disclose the formation of good quality granulated activated carbons from coconut coir and ipil-ipil when utilizing molasses as a binder.

In Release No. 0483.95 from the Office of Communications, United States Department of Agriculture, (1995), it is disclosed that granular activated carbons effective in the removal of metals may be created from agricultural wastes such as sugarcane bagasse as well as the ground hulls of soybean, cottonseed and rice. The process disclosed utilized black strap molasses as a binding agent and includes the steps of creating charcoal from briquettes in an oxygen-free furnace at over 480° C. and subsequent roasting in the presence of steam at 700° C. to create enhanced surface area.

Rivera-Utrilla et al., in a paper entitled "Effect of Carbon-Oxygen and Carbon-Nitrogen Surface Complexes on the Adsorption of Cations by Activated Carbons", [*Adsorption Science & Technology*, (1986), 3, pp.293–302] details adsorption studies of $Na^+$, $Cs^+$, $Ag^+$, $Sr^{2+}$ and $Co^{2+}$ utilizing carbons prepared from almond shells that had been activated with $CO_2$ at 850° C. for 8 hours and oxidized with air at 300° C. for 45 hours.

Molina-Sabio et al. in their paper entitled "Modification in Porous Texture and Oxygen Surface Groups of Activated Carbons by Oxidation", [*Characterization of Porous Solids II*, Rodriguez-Reinoso et al. (edit.), 1991, Elsevier Science Publishers B. V., Amsterdam] disclose that while oxidation treatment of fruit pits by either air or chemical means ($HNO_3$ or $H_2O_2$) does not substantially modify the microporosity of the carbon structures created, the chemical nature of the carbon surface is changed considerably. No projected uses for these carbons are set forth.

Periasamy et al., in an article entitled "Process Development for Removal and Recovery of Cadmium from Wastewater by a Low-Cost Adsorbent: Adsorption Rates and Equilibrium Studies", *Ind. Eng. Chem. Res.*, 33, pp.317–320, (1994), show that at a concentration of 0.7 g/L, activated carbon produced from peanut hulls was able to achieve an almost quantitative removal of Cd(II) present at a concentration of 20 mg/L in an aqueous solution at a pH range of 3.5–9.5.

Moreno-Castilla et al., in an article entitled "Activated Carbon Surface Modifications by Nitric Acid, Hydrogen Peroxide, and Ammonium Peroxydisulfate Treatments" (*Langmuir*, 1995, 11, pp.4386–4392), disclose the principle that acidic oxygen surface complexes are formed on activated carbons as a result of their treatment with either gas or solution phase oxidizing agents; and that inclusion of these complexes effect changes in the behavior of activated carbons when used either as adsorbents or catalysts.

While various methodologies for the creation of activated carbons exist, there remains a need for the creation of alternate viable and cost-effective products possessing enhanced adsorption characteristics.

SUMMARY OF THE INVENTION

We have now developed a novel process, which when carried out within specific operational parameters, effects the creation of activated carbons from low-density lignocellulosic agricultural waste possessing enhanced activity for the adsorption of metal ions. This method involves activation with either carbon dioxide or steam followed by atmospheric oxidation. It has now been discovered that the utilization of a relatively low temperature atmospheric oxidation step in conjunction with carbon dioxide or steam activation of the low-density agricultural waste carbon produces metallic binding oxygen functions in the mesopore and macropore regions of the carbon. Carbons produced by this process show metal adsorption capacities greater than that possessed by existing commercial carbons.

In accordance with this discovery, it is an object of the invention to provide a means for the creation of high quality metals-adsorbing carbons.

Another object is to provide activated carbon materials having high metal-adsorbing capacity.

Other objects and advantages of the invention will become readily apparent from the ensuing description.

DETAILED DESCRIPTION OF THE INVENTION

The present invention involves the creation of activated carbons from low-density lignocellulosic agricultural wastes, which possess enhanced adsorption ability with regard to metal cations. The carbon source for the activated carbons of the present invention may be any lignocellulosic material of plant origin having a combined cellulose and hemicellulose content greater than or equal to fifty percent (dry weight) and possessing a bulk density of less than 0.5 grams per cubic centimeter when measured for particles possessing a size range of 10 to 20 U.S. mesh. Exemplary materials include soybean hulls, rice hulls, cottonseed hulls, rice straw, wheat straw, oat straw, barley straw, sugarcane bagasse, corn cobs and peanut shells; with soybean hulls, peanut shells, rice straw and sugarcane bagasse being preferred.

According to the present invention, should a granular carbon product be desired, the low-density agricultural waste may optionally first be formed into pellets, briquettes, or extrudates by combination with a binder such as molasses, coal tar, or wood tar, before their conversion into a char. Relative ratios of the agricultural waste:binder may range from about 1:1 to about 6:1 (w/w), with a range of about 2:1 to about 4:1 being preferred. These formed precursor products are then carbonized in an inert atmosphere at temperatures ranging from about 700° C. to about 750° C. for a time ranging from about 1 hour to about 2 hours. The briquetted chars resulting from this process are then mechanically milled to a particle size no larger than about US 10 mesh so as to ensure their complete activation and oxidation under the conditions utilized in this invention. Chars resulting from pellets and extrudates, possessing maximal dimensions of 3 mm diameter and 10 mm length, are subjected to activation and oxidation without further size reduction. There is no effective limit to the minimum useable particle size, however, if a granular type product is desired, then it should be no smaller than about US 80 mesh.

Activation of the carbons is carried out by contact of the char material with carbon dioxide or steam under conditions and for sufficient time such that activation has been effected throughout the matrix of the particles of lignocellulosic material. The reaction is largely governed by transport phenomena involving diffusive processes. Particle size of the char material utilized affects the rate and degree of achievable activation. In order to achieve activation throughout the char material, particle size for the char should be no larger than about US 10 mesh, or possess cylindrical dimensions in excess of 3 mm diameter or 10 mm length. There is no effective limit to the minimum useable particle size, however, if a granular type product is desired, then it should be no smaller than about US 80 mesh. With this in mind, useable temperatures for the activation reaction may range from about 800° C. to about 950°C., and for times ranging from about 3 to about 12 hours in the case of granular carbon particles in the size range of US 10 mesh to US 80 mesh. For the case of smaller carbon particles, the skilled artisan would be able to readily determine the appropriate temperature and time conditions that would effect the activation process. The charring and activation reactors may be operated under a slight positive pressure to ensure that no atmospheric air takes part in these reactions. During activation, burn-offs ranging from about 20% to about 60% are envisioned as necessary for producing the products of the instant invention. The exact level of burnoff utilized is within the purview of the skilled artisan, and is dependent upon the specific materials and reaction conditions employed. "Burn-off" is defined as the weight loss of carbon source, as determined on a dry weight basis, that occurs during the activation process.

$$Burn\text{-}off = \frac{Wt_{ba} - Wt_{aa}}{Wt_{ba}} \times 100$$

where:
$Wt_{ba}$=dry weight before activation
$Wt_{as}$=dry weight after activation Burn-off can only be between 0 and 100%. Too little burn-off (e.g., less than about 20%) is indicative of inadequate surface area and porosity development during activation. Burn-offs in excess of about 60% generally cause concomitant decreases in product surface area and functionality due to excessive pore enlargement. In addition, larger burn-offs become uneconomical due to the reduction in the amount of product produced.

The activated carbon is then oxidized by exposure to air at a temperature ranging from about 260° C. to about 400° C. for a time ranging from about 3 to about 6 hours. Oxidation of the carbon brings about the formation of polar functional groups on the surface of the meso- and macropores of the carbonized material. It is theorized that these are instrumental in the ability of the carbon to adsorb metal cations and anions such as those selected from the group consisting of Cu(II), Zn(II), Ni(II), Cd(II), Pb(II), Cr(III, VI), Hg(II), Fe(II, III), Au(I), Ag(I), V(IV,V), U(IV), Pu(IV), Cs(I), Sr(II), Al(III), Co(II), and Sn(II,IV).

The following examples are intended to further illustrate the invention and are not intended to limit the scope of the invention which is defined by the claims.

All percentages herein disclosed are by weight unless otherwise specified.

EXAMPLE 1

Unground soybean hulls were mixed with crude sugarcane molasses preheated to 60° C. in a 3:1 ratio (wt:wt). The mixture was allowed to dry until stiff, at which time it was pelletized into 3 mm diameter×6 mm length particles using a Kahl Model 14–175 pellet press (LCI Corp., Charlotte, N.C.). Conditions included an operating pressure of approximately 5000 pounds per square inch and a temperature of approximately 65° C. The pellets thus formed were allowed to cool to air temperature and dry in a vacuum oven at 30° C. The pellets were then placed in an inert atmosphere, Grieve Model BAF-8128 bench furnace with retort (Grieve Corporation, Round Lake, Ill.), and using a nitrogen atmosphere, heated to 210° C. for 30 minutes (to remove sorbed water) then increased to 750° C. for one hour. Activation was carried out by then further increasing the reactor temperature to 850° C. and injecting low pressure steam into the nitrogen atmosphere so as to create within the retort reactor a partial pressure of steam of about 0.1 bar. Steam flow into the retort was adjusted to give a residence time of 3–4 minutes per retort volume. The activation time was 12 hours. After activation, the materials were allowed to cool to 300° C. then exposed to flowing air whose residence time was 3–4 minutes per retort volume. Air exposure at 300° C. was for 4 hours. The resultant carbons were then washed in 0.05 M HCl to remove ash, then washed with distilled water until free of measurable chloride. They were dried at 110° C. for 6 hours.

The activated carbon pellets thus produced were utilized in the following test protocol. Char yield and percent burnoff were determined by the following formulas:

Char Yield (%)=(weight of pellets after heating to 750° C. but prior to activation/Original weight of soybean pellets)× 100.

$$Burn\text{-}off = \frac{Wt_{ba} - Wt_{aa}}{Wt_{ba}} \times 100$$

where:

$Wt_{ba}$=dry weight before activation $Wt_{aa}$=dry weight after activation

The BET surface area was determined by using a Micromeritics Gemini III 2375 surface area analyzer (Micromeritics Instrument Corp., Norcross, Ga.). Surface area measurements were obtained from $N_2$ adsorption at 77 degrees Kelvin and application of the Brunauer-Emmett-Teller (BET) gas adsorption method. Bulk density was determined by a tamping procedure using a 25 ml graduated glass cylinder as described by the American Water Works Association, 1991, Bulletin 604–90, AWWA Standard for Granular Activated Carbon. Adsorption capacity of the granular activated carbons with regard to copper was determined using a 0.01 M $CuCl_2$ solution buffered at pH 5.05 with 0.035 M Na acetate and 0.011 M acetic acid. This test used 0.5 g GAC in 50 ml solution with the solution stirred (250 rpm) for 24 hr at 23° C. Afterwards, an aliquot was drawn off in a disposable syringe and filtered through a Durapore membrane 0.22 μm filter (Millipore, Bedford, Mass.). The amount of Cu (II) remaining in solution was measured by inductively coupled plasma (ICP) spectrometry (Model PS 1, Leeman Labs Inc., Lowell, Mass.). The amount of Cu(II) adsorbed was determined from the difference between these readings.

Results:

Char Yield–25%

Burn-off–57%

BET surface area–700 $m^2/g$

Bulk Density–0.35 $g/cm^3$

Copper adsorption–0.70–0.80 mmol Cu/g carbon

EXAMPLE 2

The activation atmosphere was a gas mixture with carbon dioxide at 13% (wt) and the remainder nitrogen gas. Flow volumes of retort reactor atmosphere should be adjusted to 15–20 reactor volumes per hour. Results were determined using methods and equipment identical to Example 1.

Results:

Char Yield–25%

Burn-off–22%

BET surface area–500 $m^2/g$

Bulk Density–0.42 $g/cm^3$

Copper adsorption–0.80–0.85 mmol Cu/g carbon

EXAMPLE 3

Following the protocols of Example 1, soybean hull, peanut shell, sugarcane bagasse, and rice straw were made into briquettes comprising 1 part lignocellulosic material to 1 part crude sugarcane molasses (wt/wt). The briquettes were 5.7 cm in diameter and about 3 cm in thickness. They were made with a Carver Model C laboratory press (Fred S. Carver, Inc., Wabash, Ind.) utilizing a 5.7 cm inner diameter molding cylinder. An excess of the 1:1 lignocellulosic-molasses mixture was placed inside the mold and pressed for five minutes at 5000 psi. The briquettes were then charred as described in Example 1, then crushed and sieved to a size range of 10 to 20 US mesh. Activation, oxidation, wash, and dry steps were carried out according to the protocols of Example 1, except that activation was done at 800° C. temperature. A competitive adsorption study involving the five metals Cu, Cd, Ni, Pb, and Zn in a mixture were employed. These five metals are high frequency pollutants from municipalities and specific industries throughout the United States. The metal mixture contained 2.5 mM each of Pb(II) from $Pb(NO_3)_2$, Cu(II) from $CuCl_2 \cdot 2H_2O$, Cd(II) from $Cd(NO_3)_2 \cdot 4H_2O$, Zn(II) from $ZnCl_2$, and Ni(II) from $Ni(NO_3)_2 \cdot 6H_2O$. The pH of the metal mixture was 5.0 (unbuffered). This assay used 0.5 g GAC in 50 ml of metal mixture. The mixture was stirred (250 rpm) for 2 hr at room temperature (23° C.). After stirring, an aliquot was drawn off in a disposable syringe and filtered through a Durapore Membrane 0.22 μm filter (Millipore, Bedford, Mass.). The aliquot was then analyzed for metals in the filtrate using inductively coupled plasma (ICP) spectrometry (Model PS 1, Leeman Labs Inc., Lowell, Mass.) and the amounts of metals adsorbed by the GACs were determined by difference. The BET surface area was determined by the protocol of Example 1. Comparisons were made between the metal adsorption properties of these carbons and several commercially available carbon materials; the results of which are illustrated in Table 1.

TABLE 1

Competitive Adsorption from a Solution Containing 2.5 mM of Each Metal[1]

| GAC[2] | BET Surface Area ($m^2/g$) | μmoles of metal adsorbed per 1 g of GAC | | | | | |
|---|---|---|---|---|---|---|---|
| | | $Ni^{2+}$ | $Cu^{2+}$ | $Zn^{2+}$ | $Cd^{2+}$ | $Pb^{2+}$ | Total |
| Calgon GRC[3] | 783 | 0 | 97 | 0 | 30 | 113 | 240 |
| Norit RO 3515[3] | 827 | 0 | 117 | 0 | 11 | 67 | 195 |
| Norit Vapure[3] | 876 | 0 | 98 | 0 | 4 | 66 | 168 |
| Soybean Hulls | 479 | 14 | 127 | 29 | 36 | 190 | 396 |
| Peanut Shells | 275 | 9 | 195 | 31 | 39 | 236 | 510 |
| Sugarcane Bagasse | 162 | 7 | 132 | 21 | 29 | 206 | 395 |
| Rice Straw | 460 | 2 | 144 | 24 | 32 | 174 | 376 |

[1]0.5 g GAC in 50 mL solution, initial pH 5.0, 23° C., 2 hr. stirring.
[2]Non-commercial GACs using agricultural by-products were charred as briquettes followed by crushing/sieving into granules for activation.
[3]Commercial GACs which are Calgon GRC (Calgon Carbon Corporation, Pittsburgh, PA) and Norit RO 3515 and Vapure (American Norit Company, Inc., Atlanta, GA).

EXAMPLE 4

Rice straw, sugarcane bagasse, soybean hull, cottonseed hull and rice hull were made into granular activated carbons according to the protocols used in Example 3. Disclosed in Table 2 are results of a study using both a laboratory prepared solution of three metals for measurement of adsorption capacity and a sample of actual industrial wastewater for measurement of removal efficiency. The laboratory prepared solution was prepared using a metal mixture containing 1000 ppm each of Cu(II) from $CuCl_2 \cdot 2H_2O$, Zn(II) from $ZnCl_2$, and Ni(II) from $Ni(NO_3)_2 \cdot 6H_2O$. The pH of the metal mixture was 5.0 (unbuffered). One gram of activated carbon was used with 100 mL of this solution and the solution was stirred for 2 hr at 250 rpm. The industrial wastewater, resulting from an electroplating process, contained 74.1 ppm Cu(II), 2.13 ppm Zn(II), and 41.0 ppm Ni(II) at pH 4.8. One gram of granular activated carbon was placed in a beaker along with 20 mL of the metal containing wastewater and stirred for 2 hr at 250 rpm with a Teflon™ stirring bar. For both the laboratory prepared wastewater and the actual industrial wastewater, an aliquot was removed after stirring, filtered, and analyzed identical to the protocol in Example 3. Table 2 presents the results, which illustrate the high capacity and high removal efficiencies of the instantly claimed carbons with regard to capacity and removal of metals as compared to existing commercial products.

TABLE 2

GAC Capacity, Removal Efficiency, Both by Competitive Adsorption of Cu, Zn, and Ni

| GAC | Adsorption Capacity[1] (meq/g) | Percent Removal from Metal Plating Wastewater[2] | | |
| --- | --- | --- | --- | --- |
| | | Cu (II) | Zn (II) | Ni (II) |
| Calgon GRC[3] | 0.4 | 99.8 | 100 | 97.6 |
| Darco LI (12 × 20)[3] | 0.1 | 94.3 | 40.5 | 24.3 |
| Rice straw | 1.1 | 99.9 | 100 | 99.5 |
| Sugarcane Bagasse | 0.7 | 99.9 | 100 | 99.3 |
| Soybean hulls | 1.3 | 99.9 | 100 | 99.5 |
| Cottonseed hulls | 0.7 | 98.4 | 100 | 94.0 |
| Rice hulls | 0.5 | 99.9 | 100 | 96.0 |

[1]By use of the laboratory prepared metal solution described in the narrative above.
[2]Industrial wastewater from Albuquerque, NM, and methods described in the narrative above.

Commercial GACs were Calgon GRC (Calgon Carbon Corporation, Pittsburgh, Pa.), and Darco LI (12×20) (American Norit Company, Inc., Atlanta, Ga.).

EXAMPLE 5

Soybean and cottonseed hulls were used without grinding and made into pellets as described in Example 1. The molasses-hull ratio was 1:3(wt:wt). These pellets were made into granular activated carbons using the processes described in Example 1. Metal adsorption capacity was determined by copper (II) adsorption exactly using the parameters described in Example 1, except the copper concentration was 0.02 M. A commercial GAC, Calgon GRC (Calgon Carbon Company, Pittsburgh, Pa.) was similarly tested as a comparison. Results, based on the average of three replicate runs, were as follows:

Results:
Calgon PCB copper adsorption–0.45 mmol Cu/g carbon
Soybean hull based GAC copper adsorption–0.94 mmol Cu/g carbon
Cottonseed hull based GAC copper adsorption–0.56 mmol Cu/g carbon.

We claim:

1. A process for the production of activated carbons prepared from low-density lignocellulosic agricultural material comprising the steps of:

A. admixing a binder selected from molasses, coal tar or wood tar with the low-density lignoscellulosic waste to form pellets, briquettes, or extrudates and converting them into a char;

B. contacting the charred low-density lignocellulosic material of step A with carbon dioxide or steam under conditions effective for production of an activated carbon; and C. oxidizing the activated carbon of step B in air.

2. The process of claim 1 wherein the pellets, briquettes or extrudates are converted into a char under an inert atmosphere.

3. The process of claim 2 wherein the char step is conducted at a temperature ranging from about 700° C. to about 750° C. for a time ranging from about 1 hour to about 2 hours.

4. The process of claim 1 wherein the low-density lignocellulosic agricultural material is selected from the group consisting of soybean hulls, rice hulls, cottonseed hulls, rice straw, wheat straw, oat straw, barley straw, sugarcane bagasse, corn cobs and peanut shells.

5. The process of claim 4 wherein the lignocellulosic agricultural material is selected from soybean hulls, peanut shell, rice straw and sugarcane bagasse.

6. The process of claim 1 wherein activation step B is conducted at a temperature ranging from about 800° C. to about 950° C. for a time ranging from about 3 hours to about 12 hours.

7. The process of claim 1 wherein the oxidation step C is carried out at a temperature ranging from about 260° C. to about 400° C. for a time ranging from about 3 hours to about 6 hours.

8. An activated carbon produced by the process of claim 1.

9. The activated carbon of claim 8 produced from lignocellulosic agricultural material selected from the group consisting of soybean hulls, rice hulls, cottonseed hulls, rice straw, wheat straw, oat straw, barley straw, sugarcane bagasse, corn cobs and peanut shells.

10. The activated carbon of claim 8 produced from lignocellulosic agricultural material selected from soybean hulls and rice straw.

* * * * *